R. C. SHIPPEY.
Curry-Combs.

No. 130,755.

Patented Aug. 20, 1872.

WITNESSES
H. C. Merrick
Jas Livingston

INVENTOR
Robert C. Shippey

UNITED STATES PATENT OFFICE.

ROBERT C. SHIPPEY, OF UNION, NEW YORK.

IMPROVEMENT IN CURRY-COMBS.

Specification forming part of Letters Patent No. 130,755, dated August 20, 1872.

SPECIFICATION.

I, ROBERT C. SHIPPEY, of Union, in the county of Broome and State of New York, have invented certain Improvements in Curry-Combs, of which the following is a specification:

My invention relates to the construction of a comb made of a single strip of steel-plate, having teeth resembling saw-teeth, which plate is bent in the form of a semi-oval, and riveted to arms projecting from a shank in the handle; the object of the invention being to construct a simple, cheap, and effective comb that may be readily cleansed and conveniently used on parts of the animal where the ordinary comb cannot be applied, and also to use it as a "sweat cleanser," by turning it over and applying the blank edge of the back.

Figure 1:
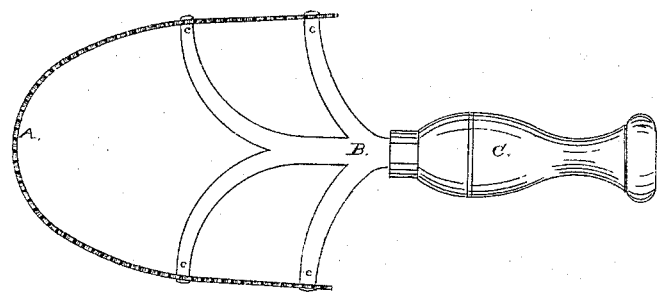
Figure 2:
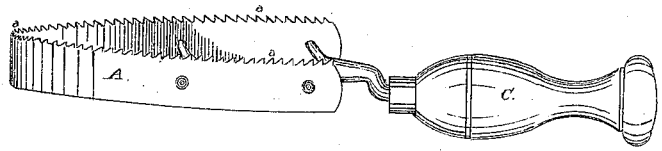
Figure 3:
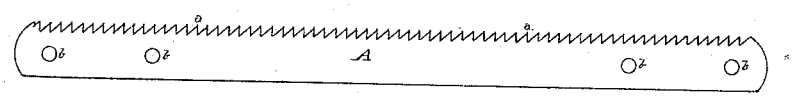

Figure 1 in the accompanying drawing is a plan of a curry-comb embodying my invention. Fig. 2 is a side elevation of the same. Fig. 3 is the unbent comb-plate.

A is the comb-plate, which is made of sufficient length to form a semi-oval of the required size, the width of which should be about one inch. The teeth $a\ a$ are made in the form of unset saw-teeth without having their cutting-edges and points. Near each end of the plate there are holes $b\ b$ for attaching it to arms $c\ c$ of the shank B, which arms project sufficiently to secure the plate A when bent to the required form by riveting. C is the handle, which is secured to the shank in the ordinary manner. When the plate A is bent to the required form the inclined edges of the teeth $d\ d$ on each side of the oval or comb are reversed, so that the comb may be used with equal effect from whatever position it may be directed, the back-action on one side having a tendency to cleanse the teeth, while the "drawing" movement on the opposite side disengages the dirt and dead hair from the skin, a slight "rap" on the side of the elastic comb-plate will effectually throw off the accumulated substance, leaving the comb thoroughly cleansed. The curve of the vertex of the oval is so small that it may be readily used in the gambrel joints and other parts of the animal where the ordinary comb cannot be made available.

I claim as my invention—

The curved comb A, forming a single piece with teeth $a\ a$, shank B, provided with arms $c\ c$, and handle C, constructed as herein described, for the purpose set forth.

ROBERT C. SHIPPEY.

Witnesses:
   J. C. ROBIE,
   SAMUEL W. BUSH.